United States Patent
Yigdall et al.

(10) Patent No.: US 10,495,303 B2
(45) Date of Patent: Dec. 3, 2019

(54) NITROGEN OXIDE ($NO_x$) EMISSION REDUCTION IN AN OXY-COMBUSTION FURNACE

(71) Applicant: Vitro Flat Glass LLC, Cheswick, PA (US)

(72) Inventors: Jeffrey S. Yigdall, Wexford, PA (US); James W. McCamy, Export, PA (US)

(73) Assignee: Vitro Flat Glass LLC, Cheswick, PA (US)

( * ) Notice: Subject to any disclaimer, the term of this patent is extended or adjusted under 35 U.S.C. 154(b) by 0 days.

(21) Appl. No.: 15/799,288

(22) Filed: Oct. 31, 2017

(65) Prior Publication Data

US 2019/0128519 A1 May 2, 2019

(51) Int. Cl.

| | |
|---|---|
| *B01D 53/56* | (2006.01) |
| *F23J 15/04* | (2006.01) |
| *F23L 7/00* | (2006.01) |
| *B01D 53/79* | (2006.01) |
| *B01D 53/90* | (2006.01) |
| *C03B 5/235* | (2006.01) |
| *F27B 9/10* | (2006.01) |
| *F27D 17/00* | (2006.01) |

(52) U.S. Cl.
CPC .............. *F23J 15/04* (2013.01); *B01D 53/56* (2013.01); *B01D 53/79* (2013.01); *B01D 53/90* (2013.01); *C03B 5/2353* (2013.01); *F23L 7/007* (2013.01); *F27B 9/10* (2013.01); *F27D 17/008* (2013.01); *B01D 2251/2062* (2013.01); *B01D 2251/2067* (2013.01); *B01D 2257/404* (2013.01); *B01D 2258/0241* (2013.01); *B01D 2258/0283* (2013.01)

(58) Field of Classification Search
CPC .............................. B01D 53/56; B01D 53/58
See application file for complete search history.

(56) References Cited

U.S. PATENT DOCUMENTS

| | | | |
|---|---|---|---|
| 3,900,554 A | 8/1975 | Lyon | |
| 4,328,020 A * | 5/1982 | Hughes | B01D 53/56 423/235 |
| 5,893,940 A * | 4/1999 | Tsai | B01D 53/56 65/29.19 |
| 6,244,854 B1 * | 6/2001 | Satchell, Jr. | F23C 3/00 239/403 |
| 6,398,547 B1 * | 6/2002 | Joshi | F23C 15/00 431/12 |
| 6,453,830 B1 * | 9/2002 | Zauderer | B01D 53/56 110/210 |

(Continued)

*Primary Examiner* — Gregory A Wilson
(74) *Attorney, Agent, or Firm* — The Webb Law Firm

(57) ABSTRACT

A plant for a combustion process. The plant has a furnace to heat a material. A burner is configured to combust a carbon-based fuel with an oxidization gas to provide a flame into the furnace. The oxidization gas has at least 80 volume percent oxygen. The furnace has an exhaust outlet providing communication between the furnace and a flue. The exhaust outlet is configured to remove an exhaust gas produced during the combustion of the carbon-based fuel from the furnace to the flue. A nozzle located in the flue is configured to inject an ammonia in the flue, and thereby reduce the amount of $NO_x$ emissions in the exhaust gas.

6 Claims, 8 Drawing Sheets

(56) References Cited

U.S. PATENT DOCUMENTS

| | | | | |
|---|---|---|---|---|
| 6,485,289 B1* | 11/2002 | Kelly | ............ | F23C 6/02 |
| | | | | 110/344 |
| 6,579,085 B1* | 6/2003 | Satchell, Jr. | ............ | F23D 14/22 |
| | | | | 239/403 |
| 8,323,602 B2* | 12/2012 | Wright | ............ | B01D 53/75 |
| | | | | 423/219 |
| 2003/0134241 A1* | 7/2003 | Marin | ............ | F23C 6/045 |
| | | | | 431/9 |
| 2011/0104628 A1* | 5/2011 | Douxchamps | ............ | C03B 5/04 |
| | | | | 432/159 |
| 2016/0209031 A1* | 7/2016 | Lou | ............ | F23N 5/242 |

* cited by examiner

| Test No. | Aqueous Ammonia Flow Rate (gallons per minute) |
|---|---|
| 1 | 1.15 |
| 2 | 1.00 |
| 3 | 0.67 |
| 4 | 0.53 |
| 5 | 0.37 |
| 6 | 0.53 |
| 7 | 0.50 |
| 8 | 0.35 |
| 9 | 0.21 |
| 10 | 0.19 |
| 11 | 0.35 |
| 12 | 0.62 |
| 13 | 0.48 |
| 14 | 0.36 |
| 15 | 0.91 |
| 16 | 0.60 |
| 17 | 0.50 |
| 18 | 0.39 |
| 19 | 0.62 |
| 20 | 0.59 |
| 21 | 0.51 |
| 22 | 0.35 |
| 23 | 0.35 |

FIG. 5

NITROGEN OXIDE ($NO_x$) EMISSION REDUCTION IN AN OXY-COMBUSTION FURNACE

BACKGROUND OF THE INVENTION

Field of the Invention

The present invention relates to reducing Nitrogen oxides ($NO_x$) from oxy-combustion furnaces. Such furnaces are used in industrial processes, including glass melting plants.

Description of Related Art

Nitrogen oxides ($NO_x$) are a relevant air pollutant. It is gaseous nitric oxide and nitrogen dioxide. These gases form smog and acid rain, as well as tropospheric ozone. $NO_x$ gases are produced when nitrogen reacts with oxygen during combustion of fuels, such as hydrocarbon fuels, at high temperatures.

One primary source of nitrogen in furnaces comes from air. Air contains approximately 78 volume percent nitrogen, and 21 volume percent oxygen. This nitrogen reacts with the oxygen in the furnace to form $NO_x$ gases. $NO_x$ emissions are regulated by governments, such as the United States Environmental Protection Agency, and state governments.

In an air-combustion furnace, $NO_x$ emissions are controlled by electrostatic precipitators ("EPs") and selective catalytic reduction ("SCR") systems. In $NO_x$ abatement systems, an EP is followed by a SCR so that the exhaust gas containing $NO_x$ emissions passes through the EP and then through the SCR system.

The SCR system involves injecting ammonia into the exhaust gas in the presence of a catalyst to react the $NO_x$ with the ammonia to form water and nitrogen gas. In SCR abatement systems, typically anhydrous ammonia, aqueous ammonia or urea is the ammonia that is added prior to the exhaust gas reaching the catalyst between the EP and SCR. The flue contains exhaust gases, which contain $NO_x$ gases. The catalyst usually includes some base metals, such as vanadium, molybdenum or tungsten; zeolites or other precious metals. One problem with metal catalysts such as vanadium and tungsten is that they are not durable under high temperatures. They also can convert $SO_2$ into $SO_3$, causing acid damage to the system. Zeolite catalysts are more stable at higher temperatures than metal catalysts; and they have a lower potential of further oxidizing $SO_2$. However, over time, the catalysts can degrade, and need to be replaced.

Given the problems associated with catalysts, methods and designs have been developed to reduce $NO_x$ without a catalyst in air combustion furnaces, which are known as selective non-catalytic reduction ("SNCR"). A SNCR involves injecting ammonia into an exhaust gas stream from an air-fueled furnace, which is disclosed in U.S. Pat. No. 3,900,554 to Lyon. Such a technique would seem attractive, except that the process is effective in only a narrow range of exhaust gas temperatures. At temperatures below the critical range, neither reaction takes place appreciably, so there is no improvement in $NO_x$ emissions. Within the temperature range, reaction predominates, and therefore there is a net reduction of $NO_x$. At higher temperatures, the reaction with ammonia with excess oxygen becomes more significant with the result that the amount of $NO_x$ in the exhaust gas stream is increased. Therefore, this $NO_x$ reduction had been considered limited in its applicability to boilers and the like where well-defined, stable temperature zones could be identified and utilized for ammonia injection.

U.S. Pat. No. 4,328,020 to Hughes disclosed a SNCR by ammonia injection into air-fueled furnace exhaust streams under certain conditions. Suitable conditions for ammonia reduction of $NO_x$ exist, or can be created, for a substantial portion of each firing cycle in a flue connecting primary and secondary regenerator chambers. Ammonia injection is discontinued whenever the temperature of the exhaust gas passing through the flue falls outside the range of 870° C. to 1090° C. (700° C. to 1090° C. if accompanied by hydrogen). In another embodiment disclosed in the aforesaid patent, ammonia is injected into two or more zones of the regenerator sequentially as the temperature in each zone passes through the effective $NO_x$ reduction range. Although the methods of that application are capable of removing a large portion of the $NO_x$ from the exhaust gas, the overall effectiveness is reduced by the ineffectiveness of the ammonia reduction technique during substantial portions of each firing cycle when the exhaust gas temperatures are unsuitable. Also, even at the optimum conditions, efficiency of the ammonia reduction reaction is not one hundred percent.

Given the limitations of SNCR systems, other methods of reducing $NO_x$ have been developed. One such method is to use an oxy-combustion gas rather than air. These furnaces use pure, or near pure oxygen rather than air. Almost all of the nitrogen is removed from the atmosphere in the furnace. Without nitrogen, $NO_x$ emissions fall dramatically, so much so that the SCR is not needed to meet current $NO_x$ emission standards.

However, oxy-combustion furnaces are not hermetically sealed. Some nitrogen-containing air enters the furnace, inevitably. Additionally, the carbon-based fuel that is burned in the furnace may also contain some nitrogen. Therefore, even in oxy-combustion furnaces, there are some $NO_x$ produced, albeit the levels of $NO_x$ produced are low enough to have been acceptable emissions under prior standards.

While there is inevitably some nitrogen in oxy-combustion furnaces for this reason, SCR and SNCR NOx abatement systems are not used in oxy-combustion furnaces because there is no reason to believe that SCR or SNCR would reduce NOx without providing significant ammonia slip. Ammonia slip is unreacted ammonia being released into the atmosphere. Since there are limits to the amount of ammonia that can be released, SCR and SNCR NOx abatement systems have not been used in oxy-combustion furnaces.

Nevertheless, given the environmental impact of $NO_x$, there is a need to further limit $NO_x$ emissions from oxy-combustion furnaces.

SUMMARY OF THE INVENTION

The invention generally relates to a plant having an oxy-combustion furnace and a NOx abatement system in a flue having nozzles configured to inject ammonia into the flue. It further relates to injecting ammonia into the exhaust gas of an oxygen-fired (also known as an oxy-combustion) furnace to lower $NO_x$ emissions. The injection is in the flue at some point after the exhaust gas exits the furnace.

A plant for a combustion process includes an oxy-combustion furnace. The furnace is configured to heat a material. The material is heated by a burner. The burner provides a flame that extends into the furnace and is connected to an oxidization gas supply and a carbon-based fuel supply. The oxidization gas has at least 80 volume percent oxygen. Within the furnace, the carbon-based fuel combusts in the presence of the oxidization gas to create a flame. The furnace has less than 5 volume percent nitrogen in the atmosphere. The combustion also creates an exhaust gas. An exhaust outlet provides communication between the furnace and a flue. The exhaust outlet is configured to remove the exhaust gas produced during the combustion process from the furnace to the flue. The exhaust gas contains $NO_x$. A $NO_x$ abatement control device is present in the flue. The $NO_x$ abatement control device includes an injection nozzle located in the flue and configured to inject ammonia into the exhaust gas. The ammonia can be selected from the group consisting of aqueous ammonia, anhydrous ammonia, urea and a combination thereof. By injecting the ammonia into the exhaust gas, the $NO_x$ reacts with the ammonia to reduce the amount of $NO_x$ that is emitted from the flue.

A method of reducing $NO_x$ production in an oxy-combustion furnace includes burning a carbon-based fuel in an oxidization gas. The oxidization gas has at least 80 volume percent oxygen. By burning the carbon-based fuel in the oxidization gas, an exhaust gas is produced that contains $NO_x$. The exhaust gas is exhausted through an exhaust outlet into a flue. In the flue, the exhaust gas reacts with an ammonia, which can be an aqueous ammonia, an anhydrous ammonia, urea or a combination thereof. The reaction reduces the amount of $NO_x$ in the exhaust gas to form a $NO_x$-reduced exhaust gas. This reaction is done without the use of a catalyst. The $NO_x$-reduced exhaust gas is exhausted out of the flue.

BRIEF DESCRIPTION OF THE DRAWING(S)

FIG. 5 is a table of flow rates of aqueous ammonia injected into the exhaust gas and flue in the examples.

DESCRIPTION OF THE INVENTION

Figure 1:
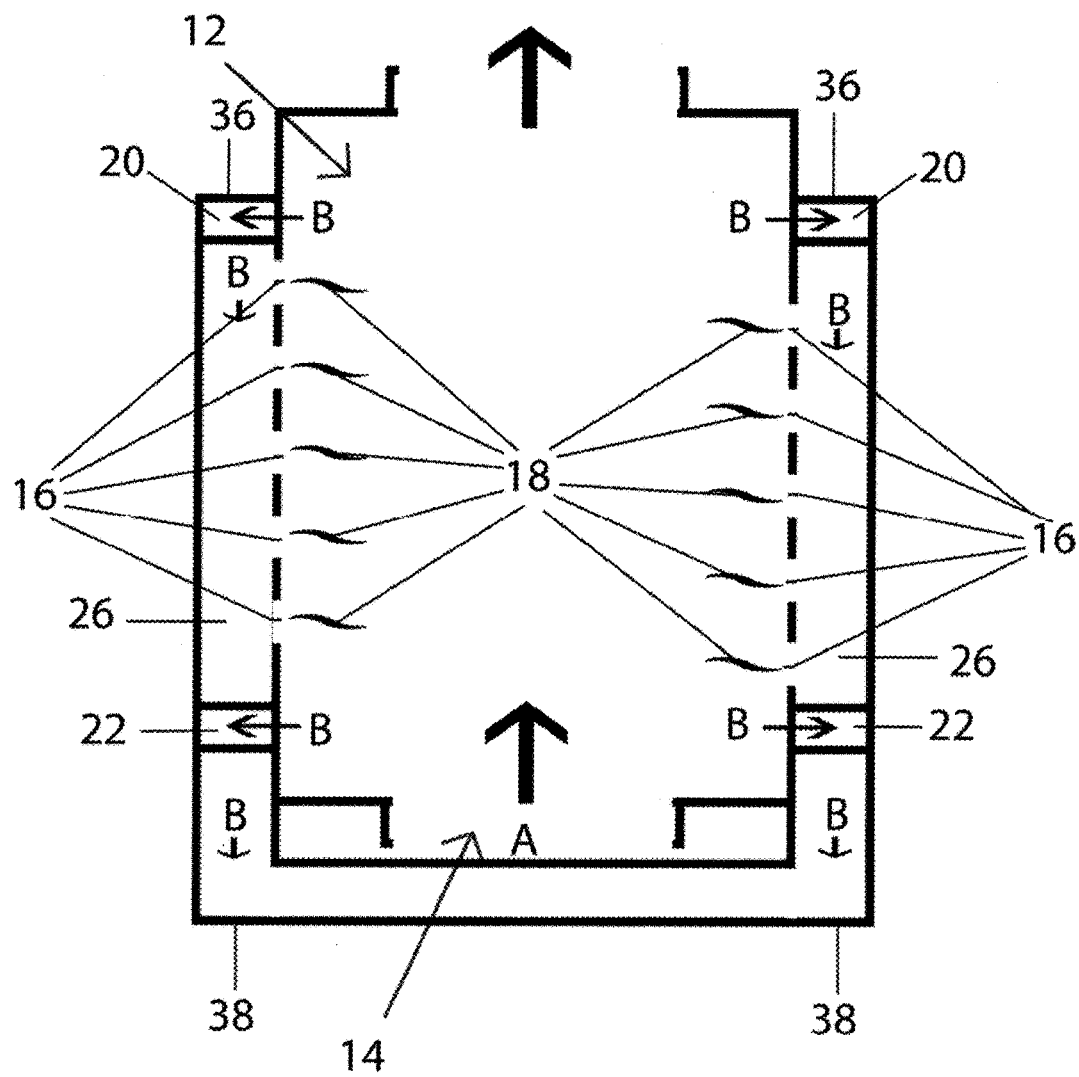
FIG. 1 is a schematic from a top-down view of a plant having an oxy-combustion furnace.

As used herein, spatial or directional terms, such as "left", "right", "inner", "outer", "above", "below", and the like, relate to the invention as it is shown in the drawing figure. However, it is to be understood that the invention can assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. Additionally, all documents, such as but not limited to, issued patents and patent applications, referred to herein are to be considered to be "incorporated by reference" in their entirety. Any reference to amounts, unless otherwise specified, is "by volume percent".

The discussion of the invention herein may describe certain features as being "particularly" or "preferably" within certain limitations (e.g., "preferably", "more preferably", or "even more preferably", within certain limitations). It is to be understood that the invention is not limited to these particular or preferred limitations but encompasses the entire scope of the disclosure.

The discussion of the invention refers to components as being "upstream" or "downstream." These terms are used in reference to the flow of the exhaust gas.

The invention relates to a plant for an industrial process. The industrial process can be any industrial process that can use an oxy-combustion furnace. For example, it can be manufacturing glass.

The plant has a furnace. The furnace can be a large capacity furnace. For example, the furnace can be a glass production furnace. The furnace may include a first end or an opening wherein raw materials can to be fed into the furnace. Upon entering the furnace, the raw materials are melted to form a molten material. The molten material can flow through a second end or discharge end.

The furnace has a combustion chamber and a melting tank. The melting tank is in communication with a feeder. The melting tank is where the raw materials are melted. The feeder holds unmelted raw materials, and provides the unmelted raw materials to the melting tank. Above the melting tank in the furnace is a combustion chamber. The combustion chamber has one or more burners that provide an oxidation gas and a carbon-based fuel to combust thereby providing heat to melt the materials in the melting tank.

In one example, the raw material may be raw glass material. The raw glass material is placed into the furnace at the first end or opening to the furnace by a charging device or feeder. Inside the furnace, the raw glass material is melted to forming molten glass. The molten glass flows out of the discharge into a fining zone.

A burner is positioned in openings in the sidewalls of the furnace. The furnace typically has at least two sidewalls—a first sidewall and a second sidewall—wherein the first sidewall is opposite the second sidewall. The sidewall has opening configured to receive the burner. The burner is configured to provide an oxygen combustion gas, fuel and/or a mixture of oxygen combustion gas and fuel to the furnace, wherein the fuel combusts to form a flame. The flame from the burner provides the energy needed to melt the raw material. The burners may extend through a wall of the furnace or through a ceiling of the furnace. The furnace may have burners on one sidewall, or on the first and second sidewall. The furnace may have at least 4, at least 6, at least 8, at least 10 or at least 12 burners; and/or at most 30 burners, at most 24 burners, at most 20 burners, at most 16 burners. The burners on the first sidewall can be staggered (as opposed to in line) with the burners on the second sidewall.

The furnace is an oxy-combustion furnace. In oxy-fuel combustion furnaces, the contribution to heat supply by convection is limited. Therefore, the burners should be placed on the side walls at a certain distance from the surface of the molten material to provide suitable distribution of energy to melt the raw glass materials. For example, the burners can be at least 0.25 m, or at least 0.40 m, and less than 1.0 m or 0.8 m from the surface of the molten material.

The oxygen combustion gas has at least 80 volume percent, at least 85 volume percent, at least 90 volume percent, at least 92 volume percent, at least 94 volume percent or at least 95 volume percent oxygen. It is fed into the burner via connection to an oxygen supply that contains the oxygen combustion gas.

The furnace is an oxy-combustion or an oxy-fueled furnace. The furnace has an atmosphere above the molten material. The atmosphere in the furnace comprises little to no nitrogen. For example, it has less than 20 volume percent, less than 15 volume percent, less than 10 volume percent, less than 5 volume percent, less than 3 volume percent, less than 2 volume percent, less than 1 volume percent or 0 volume percent nitrogen. The concentration of nitrogen may be higher and may be uncontrolled. The nitrogen may enter the furnace through leaks between the furnace wall bricks, for example.

The carbon-based fuel can be any hydro-carbon commonly burned in industrial furnaces. Examples of carbon-based fuel include natural gas, fuel oil, coke, coal, or diesel.

There is a ratio between the oxidization gas and the carbon-based fuel. That ratio is at least 1 part oxidization gas to 1 part carbon-based fuel, at least 1.5 parts oxidization gas to 1 part carbon-based fuel, 2 parts oxidization gas to 1 part carbon-based fuel, 2.5 parts oxidization gas to 1 part carbon-based fuel, or 3.0 parts oxidization gas to 1 part carbon-based fuel; and/or at most 8 parts oxidization gas to 1 part carbon-based fuel, at most 7 parts oxidization gas to 1 part carbon-based fuel, at most 6 parts oxidization gas to 1 part carbon-based fuel, or at most 5 parts oxidization gas to 1 part carbon-based fuel.

The combustion process forms an exhaust gas in the combustion chamber. The exhaust gas contains $NO_x$ gases. The NOx gases are formed by oxygen reacting with nitrogen gas. The reaction occurs due to the high heat present in the furnace. The reaction may also occur in the downcomer, flue, or elsewhere so long as the gas temperature is high enough to react the oxygen gas with the nitrogen gas. While nitrogen gas may not be intentionally pumped into the melting chamber, furnace, or flue, nitrogen gas enters the melting chamber, furnace or flue because these components are not hermetically sealed, or the nitrogen gas is released from the raw materials that are melted.

An exhaust outlet is present in the furnace. It can be in a sidewall or in a roof or ceiling of the furnace. The exhaust outlet can be positioned above the burner in the sidewall or ceiling. The exhaust outlet provides communication between the furnace and a flue. The exhaust outlet is configured to remove the exhaust gas from the furnace that is produced during the combustion process. The furnace can be 1, 2, 3, 4 or more exhaust outlets. In embodiments that have two or more exhaust outlets, at least one exhaust outlet may be positioned in the furnace downstream, and at least a second exhaust outlet may be positioned in the furnace upstream.

Optionally, a downcomer may connect the exhaust outlet with the flue. The downcomer is a duct wherein the exhaust gas travels downward from the exhaust outlet to the flue. Thus, the flue would be positioned below the exhaust outlet. Of course, a downcomer is not needed, and the flue may also be positioned on the same horizontal plain as the exhaust outlet, or above the exhaust outlet.

The flue includes a first sidewall or left sidewall, a second sidewall or right sidewall, a first endwall or upstream endwall and a second endwall or downstream endwall. The flue is in communication with the smokestack. For instance, at or near the downstream endwall of the flue, the flue connects into a smokestack or into a connector flue wherein the connector flue provides communication between the flue and the smokestack.

The plant may have two or more flues. In such a plant, the furnace that has first and second sidewalls opposite the each other. The first sidewall can have a first exhaust outlet, the second sidewall can have a second exhaust outlet. The first exhaust outlet is in communication with a first flue, and the second exhaust outlet is in communication with the second flue. The first exhaust outlet may be in communication with the first flue by an optional first downcomer, which connects the first exhaust outlet to the flue, wherein the first flue is positioned below the first exhaust outlet. Likewise, the second exhaust outlet may be in communication with the second flue by an optional second downcomer, which connects the second exhaust outlet to the second flue, wherein the second flue is positioned below the second exhaust outlet. Typically, such a plant would have a first upstream exhaust outlet and a first downstream outlet that are in fluid communication with the first flue to provide fluid communication between the first flue and the furnace so that exhaust gas can flow out of the furnace into the first flue. Likewise, the plant would have a second upstream exhaust outlet and a second downstream exhaust outlet that are in fluid communication with the second flue to provide fluid communication between the second flue and the furnace so that exhaust gas can flow out of the furnace into the second flue.

Within the flue is a $NO_x$ abatement control device. The $NO_x$ abatement control device includes a nozzle or a plurality of nozzles configured to inject ammonia into the flue and into the exhaust gas. The ammonia can be aqueous ammonia, anhydrous ammonia, urea or a combination thereof.

A nozzle or a plurality of nozzles is affixed to a mount (not shown). The mount is configured to be inserted into a flue. For example, if the flue is constructed of brick, the mount can be configured to be inserted into a location where a brick is removed.

The nozzle(s) can be placed in various locations within the flue. The nozzles can be placed on sidewalls, on endwalls, or a combination thereof. In the sidewalls, the nozzle(s) can be placed at the location where the upstream most downcomer connects into the flue, between the upstream most downcomer and the downstream most downcomer, at the location where the downstream most downcomer connects into the flue, at a position between the downstream most downcomer and the downstream endwall or connector flue.

The nozzles can be placed at a location in the flue where the exhaust gas is at a reaction temperature for the ammonia to react with the $NO_x$. The reaction temperature is between 850° C. and 1200° C.; or between 875° C. and 1150° C.; between 900° C. and 1100° C.; or between 950° C. and 1050° C.

The flue is in communication with an exhaust outlet. The flue can directly connect to the exhaust outlet, or can be in communication with the exhaust outlet. The flue can be at approximately the same horizontal plane as the exhaust outlet, above the exhaust outlet, or below the exhaust outlet. The flue can be connected to the exhaust outlet by a downcomer.

The flue has an upstream endwall and a downstream endwall. At the downstream endwall, the flue can connect to a smokestack or to a connector flue that provides communication to a smokestack and/or a second flue.

The upstream endwall of the flue is positioned on the upstream end of the flue. Typically, this is at the location where the upstream most downcomer connects into the flue, or, alternatively, where the upstream exhaust outlet connects into the flue.

The downstream endwall of the flue is at a point downstream of the downstream most downcomer where the flue connects into other components of the plant. Typically, this will be the point where the flue connects into a connector flue that provides communication between a first and a second flue or between the flue and a smokestack.

Nozzle(s) for the $NO_x$ abatement device can be placed in the upstream endwall, the downstream endwall or in a combination thereof.

Additionally or alternatively, the nozzle(s) for the $NO_x$ abatement device is located in the sidewalls, roof or floor of the flue. Nozzle(s) can be anywhere on the sidewalls, roof or floor. The sidewalls are the vertical walls (relative to the floor of the flue). Each flue typically has two sidewalls, and first sidewall and a second sidewall, a floor or a roof. Nozzle(s) can be placed in the first sidewall, the second sidewall, the roof, the floor or a combination thereof. For example, nozzle(s) can be placed in the sidewall at a position downstream of the downstream most downcomer or downstream exhaust outlet; between the downstream most endwall and the downstream most downcomer or downstream exhaust outlet; or between the downstream most downcomer or exhaust outlet and the upstream most downcomer or exhaust outlet. Preferably, the nozzle(s) are positioned between the downstream most downcomer or downstream exhaust outlet, and the downstream most endwall, more preferably closer to the downstream most downcomer or downstream exhaust outlet than the downstream most endwall, or at the junction where the downstream most downcomer connects to the flue.

The nozzle(s) for the $NO_x$ abatement device can be placed in the upstream endwall, the downstream endwall, the first sidewall, the second sidewall, the floor of the flue, the roof of the flue or a combination thereof. The nozzle(s) can be positioned only in the upstream endwall, only in the downstream endwall, only in the first sidewall, only in the second sidewall, only in the roof of the flue, or only in the floor of the flue.

Plants can have two flues, a first flue and a second flue. In such plants, the nozzle(s) for the $NO_x$ abatement device can be placed anywhere mentioned herein in both flues, or only in one flue wherein the other flue does not contain only nozzles for injection of ammonia. Thereby, ammonia is only injected into the first flue or the abatement device can be placed in the first flue and the second flue at any location mentioned herein, wherein the nozzle(s) in the second flue are closed so that no ammonia is injected into the second flue, and only the nozzle(s) in the first flue are open so that ammonia is only injected into the first flue.

Each nozzle injects ammonia into the flue and/or exhaust gas at a rate. The ammonia may be aqueous ammonia or anhydrous ammonia. In the case of aqueous ammonia, the ammonia can be at any concentration. The rate of ammonia injected through all of the nozzle(s) can be at least 0.01 gallons per minute (GPM), at least 0.03 GPM, at least 0.05 GPM, at least 0.07 GPM, at least 0.09 GPM, at least 0.11 GPM, at least 0.13 GPM or at least 0.15 GPM; and/or the rate can be at most 0.4 GPM, at most 0.35 GPM, at most 0.32 GPM, at most 0.3 GPM, at most 0.28 GPM, at most 0.25 GPM or at most 0.22 GPM. The rate of ammonia discussed herein refers to the amount of ammonia being injected. It excludes any water, for example, that may only be injected. Therefore, if one wishes to inject, for example, 0.07 GPM ammonia wherein the solution contains 20 volume percent ammonia, the aqueous ammonia would be injected at a rate of 0.35 GPM because at this rate, ammonia would be injected at a rate of 0.07 GPM.

The ammonia injected into the flue and/or exhaust gas can be anhydrous ammonia, aqueous ammonia, urea or a combination thereof.

Optionally, air can be injected into the flue. Ideally, the air should be injected where the exhaust gas temperature is at least 700° C., at least 750° C. or at least 760° C.; and the exhaust gas temperature should be less than 1000° C., less than 950° C., less than 900° C. or less than 890° C. The air should be injected at a rate of at least 5 ml/min., at least 7 ml/min. or at least 10 ml/min; and/or should be injected at a rate of at most 700 ml/min., at most 600 ml/min. or at most 500 ml/min. Air can be injected into the flue at any location within the flue, including in the sidewalls at the location where the upstream downcomer connects into the flue, between the upstream downcomer and the downstream downcomer, at the location where the downstream downcomer connects into the flue, at a position between the downstream downcomer and the downstream endwall or connector flue; in the downstream endwall or in the upstream endwall.

There is no flue gas heat recovery system or regenerator system in the plant. A regenerator system is a system that recovers heat from the exhaust gas. This is done by reversing the flow of exhaust gas periodically. The flue is made of a material, such as a brick, that can absorb some of the heat contained in the exhaust gas. In order to efficiently run an air-fueled furnace, the air should be pre-heated before combustion. This is done by a regenerator system that uses the heat trapped in the bricks to heat the air. An example of such a system is provided in U.S. Pat. No. 4,372,770 to Krumwiede et al. The invention described and claimed herein does not need to use a regenerator system.

A plant using the $NO_x$ abatement system described herein also does not need an electrostatic precipitator or a catalyst to react the $NO_x$ with the ammonia.

The invention also relates to a method of reducing $NO_x$ emissions from an exhaust gas produced during an industrial process. The exhaust gas is created by burning a carbon-based fuel in an oxidation gas in a furnace. The furnace can be a large capacity furnace, such as a glass production furnace. Raw materials are fed into the furnace. Upon entering the furnace, the raw materials are melted to form a molten material. The raw materials are melted by the combustion of a carbon-based fuel in an oxidation gas.

The oxidation gas has at least 80 volume percent, at least 85 volume percent, at least 90 volume percent, at least 92 volume percent, at least 94 volume percent or at least 95 volume percent oxygen. It is fed into the furnace through a burner. For example, the burner is connected to an oxidation gas supplied and a carbon-based fuel supply, wherein the burner provides the oxidation gas and the carbon-based fuel to the furnace.

The oxidation gas and the carbon-based fuel is supplied at a ratio of 1 part oxidization gas to 1 part carbon-based fuel, at least 1.5 parts oxidization gas to 1 part carbon-based fuel, 2 parts oxidization gas to 1 part carbon-based fuel, 2.5 parts oxidization gas to 1 part carbon-based fuel, or 3.0 parts oxidization gas to 1 part carbon-based fuel; and/or at most 8 parts oxidization gas to 1 part carbon-based fuel, at most 7 parts oxidization gas to 1 part carbon-based fuel, at most 6 parts oxidization gas to 1 part carbon-based fuel, or at most 5 parts oxidization gas to 1 part carbon-based fuel.

The furnace has an atmosphere. The atmosphere is controlled so that the furnace has little to no nitrogen. For example, the furnace has less than 5 volume percent, less than 3 volume percent, less than 2 volume percent, less than 1 volume percent or 0 volume percent of nitrogen.

As a result of combusting the carbon-based fuel in the oxidation gas, an exhaust gas is formed. The exhaust gas is exhausted from the furnace through an exhaust outlet, or a plurality of exhaust outlets. For example, the exhaust gas can be exhausted from the furnace through at least two exhaust outlets, at least three exhaust outlets, at least four exhaust outlets, or more. The exhaust outlets are positioned in a sidewall of the furnace, or in the roof or ceiling of the furnace. In the event that there are two or more exhaust outlets, one exhaust outlet may be positioned on a first sidewall for the furnace, and the second exhaust outlet may be positioned on a second sidewall for the furnace that is opposite the first sidewall. There can be a downstream most exhaust outlet and an upstream most exhaust outlet.

The exhaust outlet(s) is in fluid communication with a flue. The exhaust gas can flow out of the furnace into a flue. The flue may be positioned on approximately the same horizontal plane as the exhaust outlet(s), above the exhaust outlet(s) or below the exhaust outlet(s). The flue may be connected to the exhaust outlet via a downcomer. In such an instance, the exhaust gas would flow out of the exhaust outlet, down the downcomer into the flue.

Ammonia is injected into the flue via a nozzle or nozzles. The ammonia reacts with the exhaust gas. Specifically, the ammonia reacts with the $NO_x$ that is within the exhaust gas to form water and nitrogen gas. The ammonia can be aqueous ammonia, anhydrous ammonia, urea or a combination thereof.

The ammonia is injected at a rate, which is calculated based on all of the nozzles. The ammonia may be anhydrous ammonia, aqueous ammonia, urea or a combination thereof. The total flow rate of ammonia injected through all of the nozzle(s) can be at least 0.01 gallons per minute (GPM), at least 0.03 GPM, at least 0.05 GPM, at least 0.07 GPM, at least 0.09 GPM, at least 0.11 GPM, at least 0.13 GPM or at least 0.15 GPM; and/or the rate can be at most 0.4 GPM, at most 0.35 GPM, at most 0.32 GPM, at most 0.3 GPM, at most 0.28 GPM, at most 0.25 GPM or at most 0.22 GPM. The rate of ammonia discussed herein refers to the amount of ammonia being injected. It excludes any water, for example, that may only be injected. Therefore, if one wishes to inject, for example, 0.07 GPM ammonia wherein the solution contains 20 volume percent ammonia, the aqueous ammonia would be injected at a rate of 0.35 GPM because at this rate, ammonia would be injected at a rate of 0.07 GPM.

The ammonia should be injected into the flue at a location where the exhaust gas is at a reaction temperature. The reaction temperature is between 850° C. and 1200° C.; or between 875° C. and 1150° C.; between 900° C. and 1100° C.; or between 950° C. and 1050° C.

The ammonia can be injected through one or both sidewalls of the flue, through an endwall in the flue, through the roof or ceiling of the flue, through the floor of the flue or a combination thereof. The ammonia can be injected through the upstream endwall, which is the endwall where the upstream most downcomer connects into the flue; in a sidewall, ceiling or floor of the flue between the upstream most downcomer and the downstream most downcomer; in a sidewall or floor of the flue where the downstream most downcomer connects into the flue; in a sidewall, ceiling or floor of the flue between the downstream most downcomer and the downstream endwall, connector flue or smokestack.

Ammonia can be injected through a plurality of nozzles in these locations. For example, there can be at least 2, at least 4, or at least 6 nozzles at each location, and/or at most 14, at most 12 or at most 10 nozzles at each location. In instances where the ammonia is injected through a plurality of nozzles at a single location, the nozzles can be aligned horizontally and/or aligned vertically to another nozzle. For example, ammonia can be injected through a nozzle positioned in an upper half of the sidewall or endwall, lower half of the sidewall or endwall, left half of the endwall or right half of the endwall. In specific examples, ammonia is injected into the flue through either four nozzles or eight nozzles.

Once injected into the flue, the $NO_x$ in the exhaust gas reacts with the ammonia to form nitrogen gas and water, and thereby reduces the $NO_x$ emission. The nitrogen gas and water travel through the remainder of the flue, and optionally into a connector flue, and is discharged through a smokestack.

Example 1

Figure 2:
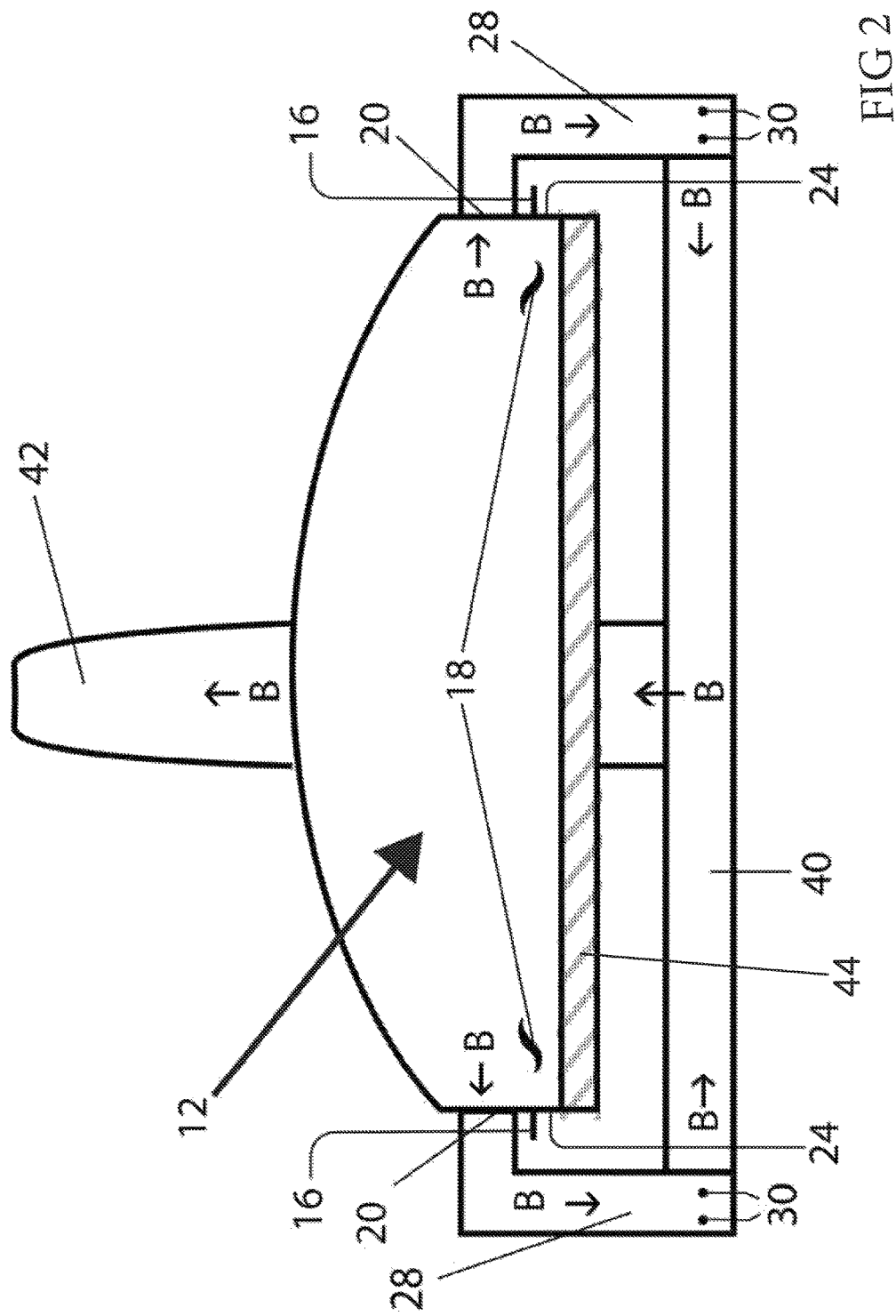
FIG. 2 is a cross-section view of a plant having an oxy-combustion furnace.

FIGS. 1 and 2 show an exemplary plant with $NO_x$ abatement system according to the invention. The plant has a furnace 12 into which glass material can be fed or charged through charging opening 14. Raw glass materials are fed through the charging opening 14 into the furnace 12 as indicated by arrow A in FIG. 1.

The furnace has a plurality of burners 16 that provide a mixture of a carbon-based fuel and an oxidation gas, and are configured to combust the carbon-based fuel with the oxidation gas to form a plurality of oxy-fueled combustion flames 18. The burners 16 are positioned in openings in sidewalls 24 of the furnace 12. Each burner 16 opening in the sidewall 24 is staggered from a burner 16 opening in the opposite sidewall 24 so that no burner 16 opening is directly opposite another. Each burner 16 is connected to an oxidation gas supply and a carbon-based fuel supply by a separate supply line for each supply. The oxidation gas is mostly oxygen, and has at least 95 volume percent oxygen. The oxidation gas contained less than 1 volume percent nitrogen gas, or no nitrogen gas. The carbon-based fuel in this example is natural gas. This oxidation gas and carbon-based fuel are pumped into the furnace 12 through the burners 16. The oxidation gas and carbon-based fuel are pumped in the furnace 12 at a ratio of at least 1.5 oxidation gas to 1 carbon-based fuel, to at most 2.5 oxidation gas to 1 carbon-based fuel, or more preferably at about 2 oxidation gas to 1 carbon-based fuel.

The furnace 12 does not contain any burners 16 that combust a carbon-based fuel in the presence of a different oxidation gas, specifically, air or a gas that has more than 5 volume percent nitrogen gas. Thus, the furnace 12 is an oxy-combustion furnace or an oxy-fueled furnace. Thus, the combustion chamber has less than 5 volume percent nitrogen gas in its atmosphere.

Inside the furnace 12, the carbon-based fuel combusts to form a flame 18 in the presence of the oxidation gas. The flame melts the raw glass materials and forms a molten glass 44. The combustion of the carbon-based fuel and oxidation gas forms an exhaust gas.

The furnace 12 in this example has four exhaust outlets. There are two upstream exhaust outlets 20 one in each sidewall 24, and two downstream exhaust outlets 22, one in the first sidewall and another in the second sidewall 24. The exhaust outlets 20, 22 provide communication between the furnace 12 and two flues 26, a first flue and a second flue.

The first and second flues 26 are connected to the exhaust outlets 20, 22 by downcomers 27, 28. Two downcomers 27, 28 connect into the first flue 26 and the two other downcomers 27, 28 connect into the second flue 26 to the exhaust outlets 20, 22. The exhaust gas flows out of the furnace 12 through the exhaust outlets 20, 22 along exhaust path B into the first and second flues 26.

Figure 3A:
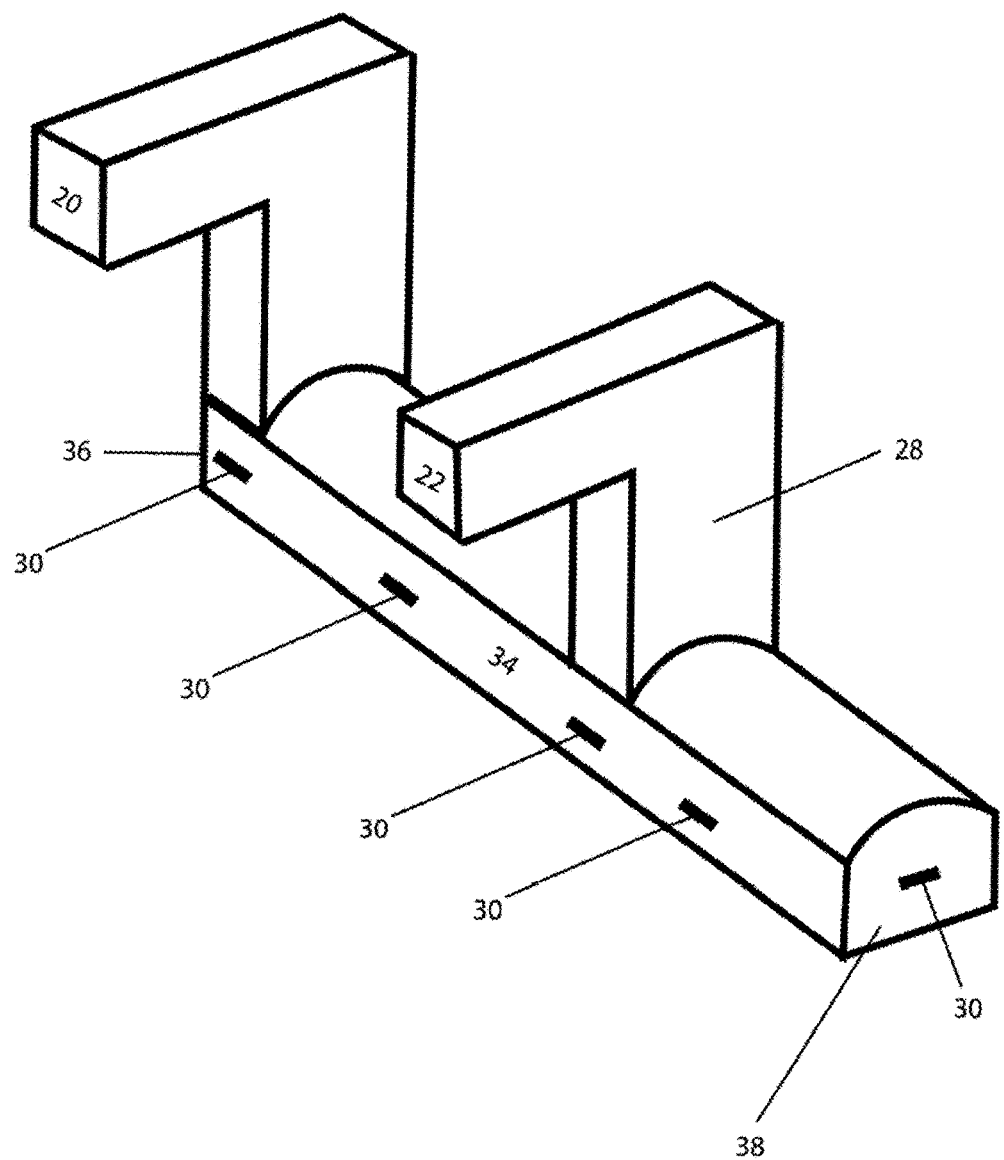
FIG. 3A is a view of an inside sidewall of a flue and downcomer.
Figure 3B:
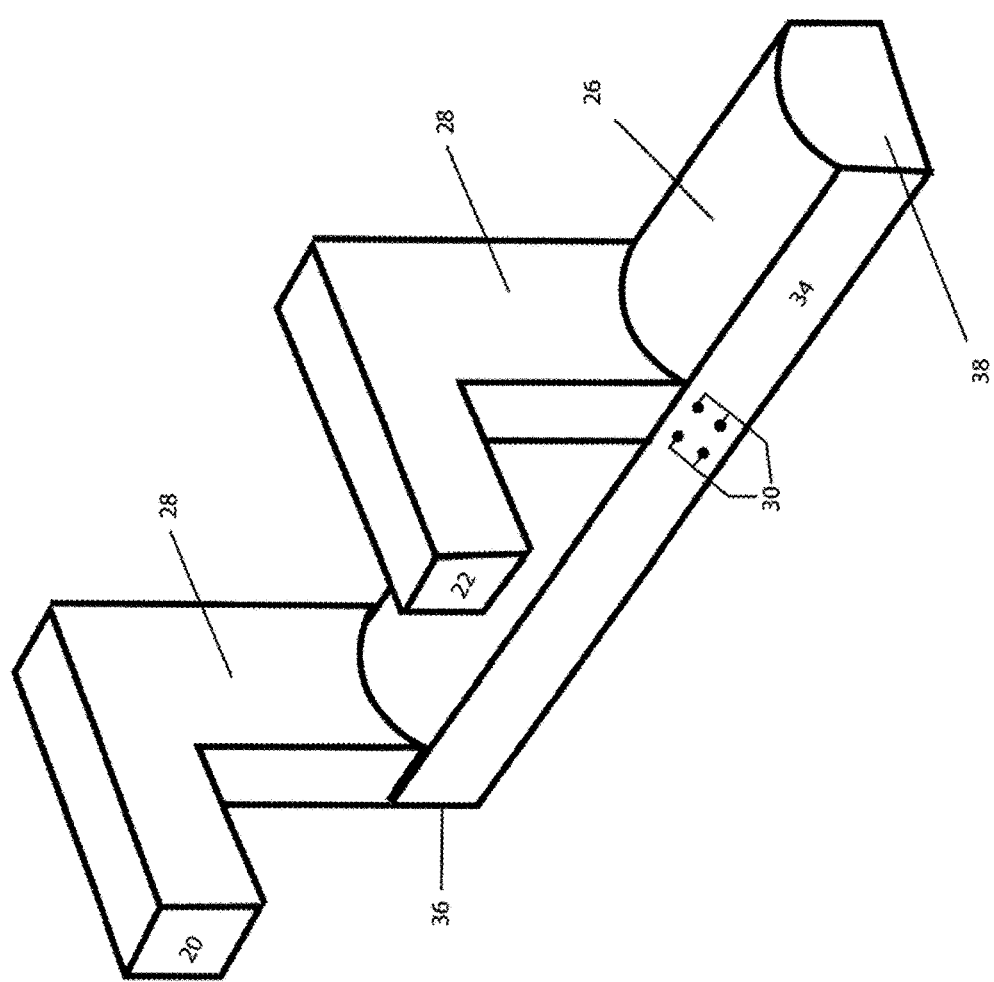
FIG. 3B is a view of an inside sidewall of a flue and downcomer.
Figure 4A:
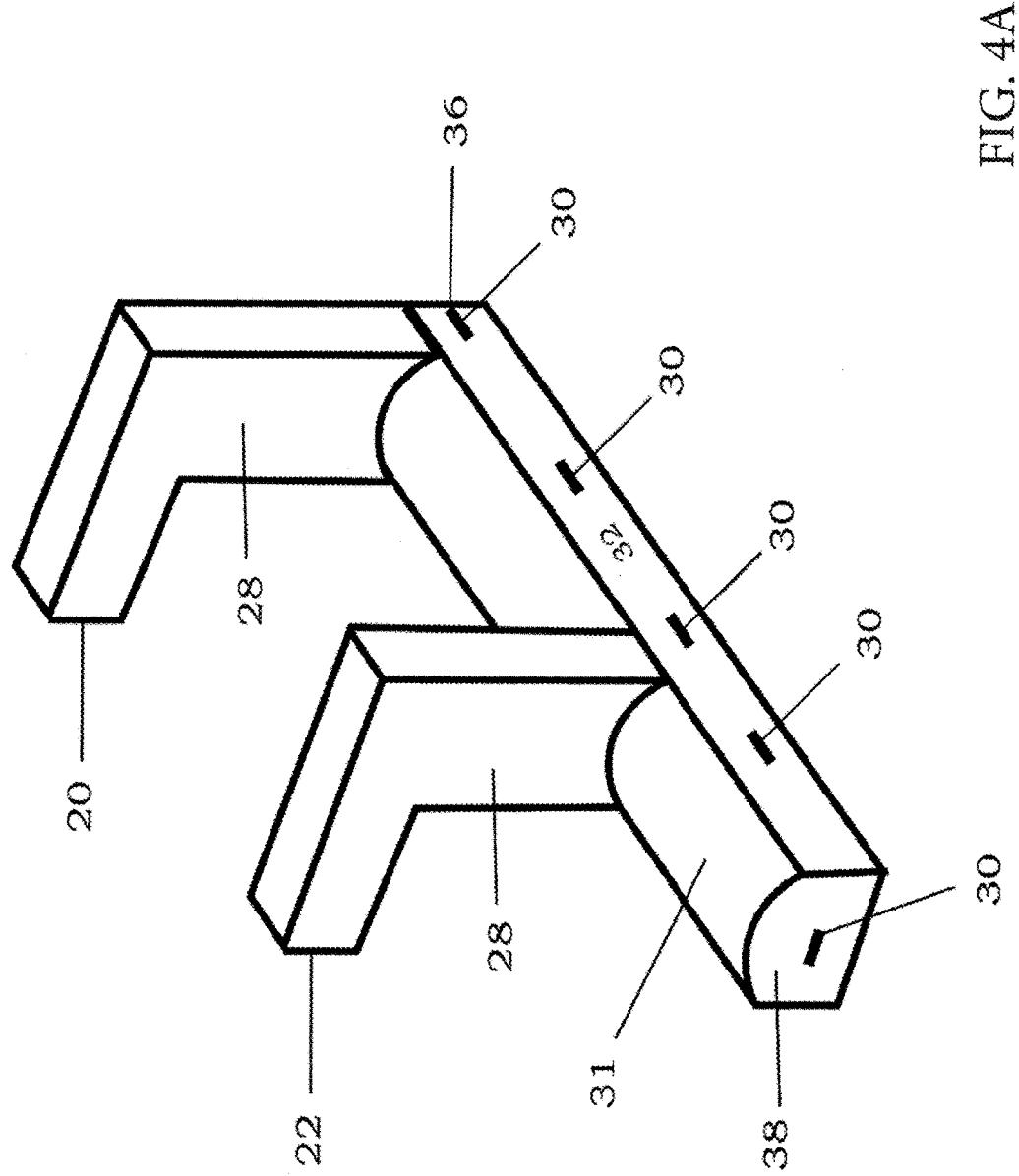
FIG. 4A is a view of an outside sidewall of a flue and downcomer.
Figure 4B:
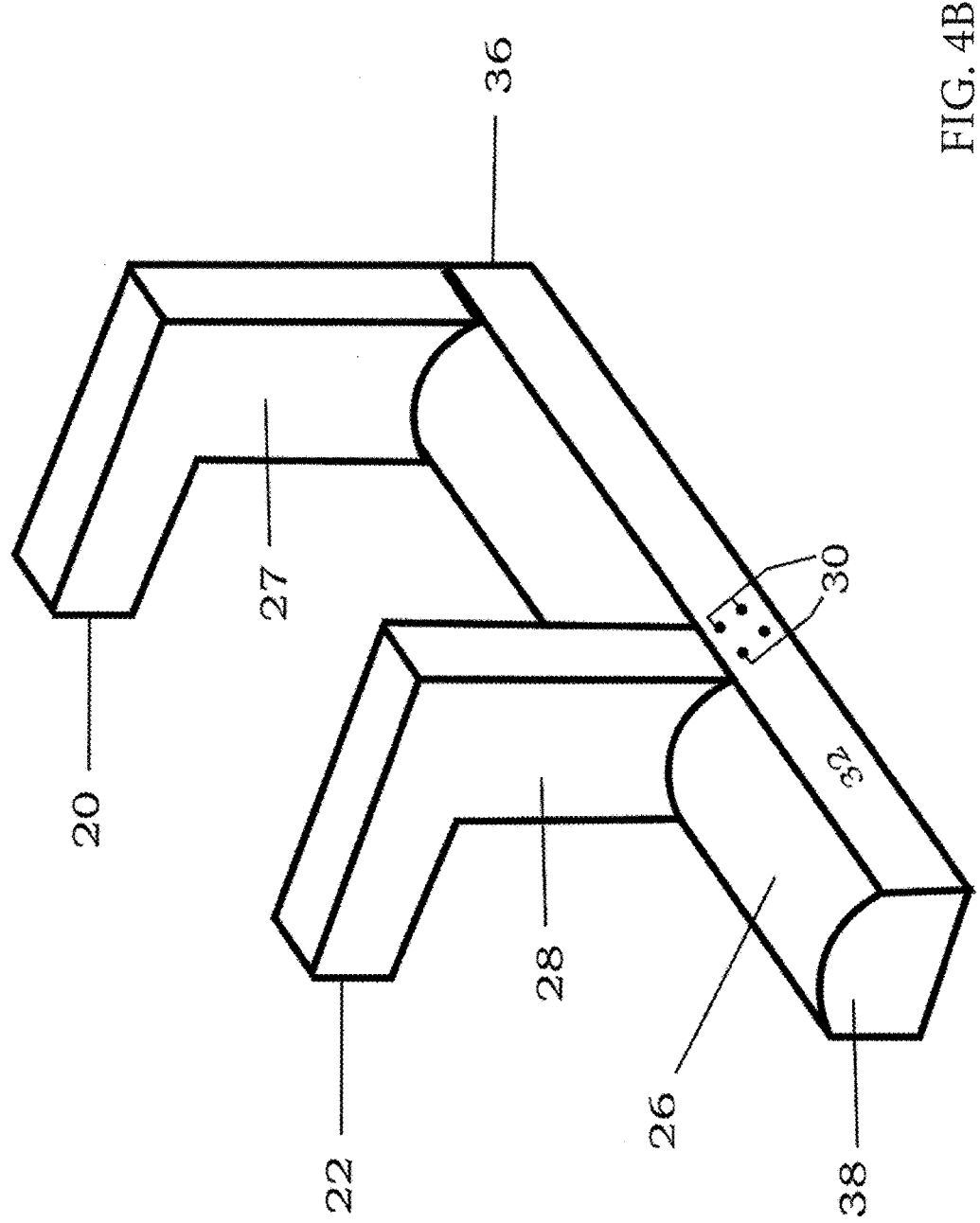
FIG. 4B is a view of an outside sidewall of a flue and downcomer.
Figure 6:
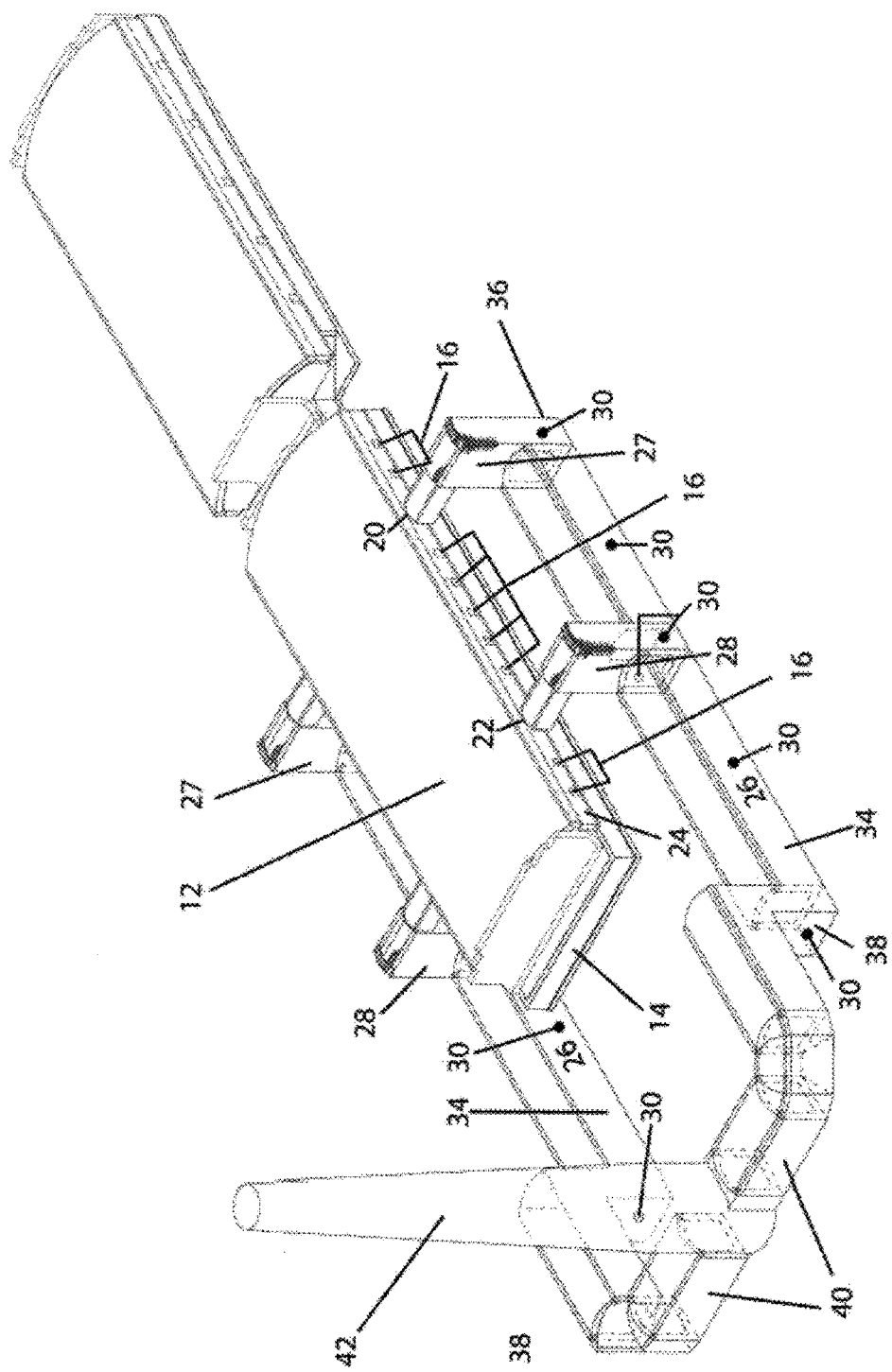
FIG. 6 is a schematic drawing of a plant having a oxy-combustion furnace, two upstream exhaust outlets, two downstream exhaust outlets, two upstream most downcomers, two downstream move downcomers, two flues, a connector flue and a smokestack

Referring to FIGS. 3-5, each flue 26, has a $NO_x$ abatement device, which includes at least one nozzle 30, or a plurality of nozzles 30. In this example, four nozzles 30 are positioned on the first sidewall 32, four nozzles 30 are positioned on the second sidewall 34 of the first and second flues 26, and four nozzles 30 were placed in the upstream endwall 36 of the first and second flues 26. Thus, each flue contains 12 nozzles at three locations. Each nozzle 30 could independently be turned on or off to control the location of where the ammonia is added. An ammonia pump controls a flow rate at which the ammonia is supplied. Thus, an operator could control where the ammonia was being pumped into the flues 26, as well as the amount of ammonia pumped into the flues 26.

Specifically, eight nozzles were installed at each 32, 34 sidewall of the flue 26 where the downstream-most downcomer 28 connects into the flue 26. Each sidewall 32, 34 of each flue 26 has two nozzles 30 at the top portion of the sidewall, and two nozzles 30 at the bottom portion of the sidewall 32, 34, as shown in FIGS. 3-4. Thus, each flue 26 has four nozzles 30 on the first sidewall 32 and four nozzles 30 on the second sidewall 34. In total, each flue 26 has eight nozzles 30 between both sidewalls 32, 34 at approximately where the downstream most downcomer 28 connects into the flue 26.

The number of nozzles 30 is not critical, and were merely used as a means to control the flow-rate of ammonia in the examples. It is foreseeable that a single nozzle 30 at any of the locations described herein would be sufficient so long as that nozzle 30 can deliver the appropriate volume of ammonia for the amount of exhaust gas in the flue.

Each nozzle 30 was connected to an ammonia pump via ammonia lines, not shown in the figures. The nozzles 30 were also connected to a local air supply, also not shown in the figures. The ammonia was injected into the exhaust gas at a rate of 0.01 GPM to 0.8 GPM. This injection rate is the rate of ammonia being added across all nozzles 30. Preferably, the ammonia flowrate should be between 0.05 GPM and 0.22 GPM.

The first and second flues 26 connect into a connector flue 40 at or near the downstream endwall 38 of the first and second flues. The connector flue 40 provides communication between the first flue 26 the second flue 26, and the smokestack 42. The exhaust outlets 20, 22; the downcomers 27, 28; first and second flues 26, the connector flue 40 and the smokestack 42 are configured to exhaust gas that is exhausted from the furnace 12 out of the plant through the smokestack 42. The exhausted exhaust gas out of the smokestack 42 has a reduced amount of $NO_x$ as compared to the exhaust gas found in the furnace 12.

While this example provides specific locations for the nozzles 30 and a specific number of nozzles 30 as each location, one of ordinary skill would readily recognize that the locations and number of nozzles 30 can be varied to other locations or other number of nozzles 30. For example, only one nozzle can be used at each location, or the locations can be between the downstream most downcomer 28 and the downstream endwall 38, in the downstream endwall 38, between the downstream most downcomer 28 and the upstream endwall 36, or in a sidewall 32 or 34 at a location where the upstream most downcomer 27 connects into the flue 26. Furthermore, through NOx abatement device and/or nozzle(s) 30 can be installed at one or more of these locations, only in the first flue 26 or only in the second flue 26. The nozzles 30 can alternatively be installed in the ceiling (or roof) or floor of the first and/or second flue 26.

At the opening or charging end 14, raw glass materials were fed into the furnace 12 via a charging device. Within the furnace 12, the burners 16 supplied an oxygen combustion gas and a carbon-based fuel, wherein the carbon-based fuel combusts in the presence of the oxygen combustion gas. There was little to no nitrogen intentionally added to the atmosphere of the furnace 12. To the extent that nitrogen gas was present, it would have seeped into the furnace 12 due to the fact that the furnace 12 was not hermetically sealed.

The combustion of the carbon-based fuel and oxygen would form molten glass 44 and an exhaust gas. Due to the fact that some nitrogen would seep into the furnace 12, the exhaust gas contained some $NO_x$. The exhaust gas would discharge from the furnace 12 via the left and right exhaust outlets 20 and 22 into left and right downcomers 27 and 28. It would continue along path B into first and second flues 26.

Within the flues, ammonia would be injected through the nozzles 30 installed into the flue 26 at the locations described above. The ammonia would react with the $NO_x$ to form nitrogen and water, thereby would reduce the $NO_x$ emission produced by the oxy-combustion furnace 12.

In Examples 1-22, reference is made to sidewalls 32, 34 of the flue 26, and locating where the nozzles 30 are installed in the sidewalls 32, 34. Unless expressly stated, it is understood that the nozzle(s) 30 in the sidewalls 33, 34 can be placed in any position on the sidewall 32, 34 of the flue 26, and that the roof of the flue 26 and floor of the flue 26 are adequate substitutes for sidewall 32, 34.

Example 2

In this example, the plant is configured similar to the Example 1, except that the $NO_x$ abatement device nozzles are only positioned in the upstream endwalls 36 of the first and second flues 26. To the extent that $NO_x$ abatement device nozzles 30 are present at any other location, those nozzles have been turned-off so no ammonia can be pumped in the flue at the other locations. Therefore, ammonia is injected or is only injected into the flue at the upstream endwalls 36 of the first and second flues 26.

Example 3

In this example, the plant is configured similar to the Example 1, except that the $NO_x$ abatement device nozzles are only positioned in the first sidewall 32 and second sidewall 34 of the first and second flues 26. To the extent that $NO_x$ abatement device nozzles 30 are present at any other location, those nozzles 30 have been turned-off so no ammonia can be pumped in the flue at the other locations. Therefore, ammonia is injected or is only injected at the first sidewall 32 and second sidewall 34 of the first and second flues 26.

Example 4

In this example, the plant is configured similar to the Example 1, except that the $NO_x$ abatement device nozzles are only positioned in the upstream endwalls 36 of only one flue 26 or the first flue 26 and not in both flues. To the extent that $NO_x$ abatement device nozzles 30 are present at any other location, those nozzles 30 have been turned-off so no ammonia can be pumped in the flue at the other locations. Therefore, ammonia is injected or is only injected into one flue or the first flue 26 at the upstream endwalls 36.

Example 5

In this example, the plant is configured similar to the Example 1, except that the $NO_x$ abatement device nozzles are only positioned in the first sidewall 32 and second sidewall 34 of only one flue 26 or the first flue 26. To the extent that $NO_x$ abatement device nozzles 30 are present at any other location, those nozzles 30 have been turned-off so no ammonia can be pumped in the flue at the other locations. Therefore, ammonia is injected or is only injected into the first flue 26 at the first sidewall 32 and second sidewall 34.

Example 6

In this example, the plant is configured similar to the Example 1, except that the $NO_x$ abatement device nozzles are only positioned in the downstream endwalls 38 of the first and second flues 26. To the extent that $NO_x$ abatement device nozzles 30 are present at any other location, those nozzles have been turned-off so no ammonia can be pumped in the flue at the other locations. Therefore, ammonia is injected or is only injected into the flue 26 at the downstream endwalls 38 of the first flue 26 and the second flue 26.

Example 7

In this example, the plant is configured similar to the Example 1, except that the $NO_x$ abatement device nozzles are only positioned in the downstream endwalls 38, the first side wall 32 and the second sidewall 34 of the first and second flues 26. To the extent that $NO_x$ abatement device nozzles 30 are present at any other location, those nozzles have been turned-off so no ammonia can be pumped in the flue at the other locations. Therefore, ammonia is injected or is only injected into the flue 26 at the downstream endwalls 38, the first side wall 32 and the second sidewall 34 of the first flue 26 and the second flue 26.

Example 8

In this example, the plant is configured similar to the Example 1, except that the $NO_x$ abatement device nozzles are only positioned in the downstream endwalls 38 and the upstream endwalls 36 of the first and second flues 26. To the extent that $NO_x$ abatement device nozzles 30 are present at any other location, those nozzles have been turned-off so no ammonia can be pumped in the flue at the other locations. Therefore, ammonia is injected or is only injected into the flue 26 at the downstream endwalls 38 and the upstream endwalls 36 of the first flue 26 and the second flue 26.

Example 9

In this example, the plant is configured similar to the Example 1, except that the $NO_x$ abatement device nozzles are only positioned in the downstream endwalls 38 of only one flue 26 or the first flue 26. To the extent that $NO_x$ abatement device nozzles 30 are present at any other location, those nozzles have been turned-off so no ammonia can be pumped in the flue at the other locations. Therefore, ammonia is injected or is only injected into one flue 26 at the downstream endwalls 38.

Example 10

In this example, the plant is configured similar to the Example 1, except that the $NO_x$ abatement device nozzles are only positioned in the downstream endwalls 38, the first side wall 32 and the second sidewall 34 of only one flue 26 or the first flue 26. To the extent that $NO_x$ abatement device nozzles 30 are present at any other location, those nozzles have been turned-off so no ammonia can be pumped in the flue at the other locations. Therefore, ammonia is injected or is only injected into the flue 26 at the downstream endwalls 38, the first side wall 32 and the second sidewall 34 of only one flue 26 or the first flue 26.

Example 11

In this example, the plant is configured similar to the Example 1, except that the $NO_x$ abatement device nozzles are only positioned in the downstream endwalls 38, the first side wall 32, the second sidewall 34 and the upstream endwall 36 of the first and second flues 26. To the extent that $NO_x$ abatement device nozzles 30 are present at any other location, those nozzles have been turned-off so no ammonia can be pumped in the flue at the other locations. Therefore, ammonia is injected or is only injected at the downstream endwalls 38, the first side wall 32, the second sidewall 34 and the upstream endwall 36 of the first flue 26 and the second flue 26.

Example 12

In this example, the plant is configured similar to the Example 1, except that the $NO_x$ abatement device nozzles are only positioned in the downstream endwalls 38, the first side wall 32, the second sidewall 34 and the upstream endwall 36 of the first and second flues 26. To the extent that $NO_x$ abatement device nozzles 30 are present at any other location, those nozzles have been turned-off so no ammonia can be pumped in the flue at the other locations. Therefore, ammonia is injected or is only injected at the downstream endwalls 38, the first side wall 32, the second sidewall 34 and the upstream endwall 36 of the first flue 26 and the second flue 26.

Example 13

In this example, the plant is configured similar to the Example 1, except that the $NO_x$ abatement device nozzles are only positioned in the only one sidewall, the first sidewall 32 or the second sidewall 34 of the first and second flues 26. To the extent that $NO_x$ abatement device nozzles 30 are present at any other location, those nozzles 30 have been turned-off so no ammonia can be pumped in the flue at the other locations. Therefore, ammonia is injected or is only injected into the flue at only one sidewall—the first sidewall 32 or the second sidewall 34—of the first and second flues 26.

Example 14

In this example, the plant is configured similar to the Example 1, except that the $NO_x$ abatement device nozzles are only positioned in the only one sidewall, the first sidewall 32 or the second sidewall 34, of only one flue 26 the first flue 26. To the extent that $NO_x$ abatement device nozzles 30 are present at any other location, those nozzles 30 have been turned-off so no ammonia can be pumped in the flue at the other locations. Therefore, ammonia is injected or is only injected into the flue at only one sidewall—the first sidewall 32 or the second sidewall 34—of only one flue 26—the first flue 26.

Example 15

In this example, the plant is configured similar to the Example 1, except that the $NO_x$ abatement device nozzles are only positioned in the upstream endwalls 36, the first side wall 32 and the second sidewall 34 of the first and second flues 26. To the extent that $NO_x$ abatement device nozzles 30 are present at any other location, those nozzles have been turned-off so no ammonia can be pumped in the flue at the other locations. Therefore, ammonia is injected or is only injected into the flue 26 at the upstream endwalls 36, the first side wall 32 and the second sidewall 34 of the first flue 26 and the second flue 26.

Example 16

In this example, the plant is configured similar to the Example 1, except that the $NO_x$ abatement device nozzles are only positioned in the upstream endwalls 36, the first side wall 32 and the second sidewall 34 of only one flue 26—the first flue 26. To the extent that $NO_x$ abatement device nozzles 30 are present at any other location, those nozzles have been turned-off so no ammonia can be pumped in the flue at the other locations. Therefore, ammonia is injected or is only injected into the flue 26 at the upstream endwalls 36, the first side wall 32 and the second sidewall 34 of only one flue 26—the first flue 26.

Example 17

In this example, the plant is configured similar to the Example 1, except that the $NO_x$ abatement device nozzles are only positioned in the upstream endwalls 36, and only one sidewall—the first side wall 32 or the second sidewall 34—of the first and second flues 26. To the extent that $NO_x$ abatement device nozzles 30 are present at any other location, those nozzles have been turned-off so no ammonia can be pumped in the flue at the other locations. Therefore, ammonia is injected or is only injected into the flue 26 at the upstream endwalls 36, only one sidewall—the first side wall 32 or the second sidewall 34—of the first flue 26 and the second flue 26.

Example 18

In this example, the plant is configured similar to the Example 1, except that the $NO_x$ abatement device nozzles are only positioned in the upstream endwalls 36, and only one sidewall—the first side wall 32 or the second sidewall 34—of only one flue 26—the first flue 26. To the extent that $NO_x$ abatement device nozzles 30 are present at any other location, those nozzles have been turned-off so no ammonia can be pumped in the flue at the other locations. Therefore, ammonia is injected or is only injected into the flue 26 at the upstream endwalls 36, only one sidewall—the first side wall 32 or the second sidewall 34—of only the first flue 26.

Example 19

In this example, the plant is configured similar to the Example 1, except that the $NO_x$ abatement device nozzles are only positioned in the downstream endwalls 38 and the upstream endwalls 36 of only one flue 26—the first flue 26. To the extent that $NO_x$ abatement device nozzles 30 are present at any other location, those nozzles have been turned-off so no ammonia can be pumped in the flue at the other locations. Therefore, ammonia is injected or is only injected into the flue 26 at the downstream endwalls 38 and the upstream endwalls 36 of only the first flue 26.

Example 20

In this example, the plant is configured similar to the Example 1, except that the $NO_x$ abatement device nozzles are only positioned in the downstream endwalls 38, only one sidewall—the first side wall 32 or the second sidewall 34—and the upstream endwall 36 of the first and second flues 26. To the extent that $NO_x$ abatement device nozzles 30 are present at any other location, those nozzles have been turned-off so no ammonia can be pumped in the flue at the other locations. Therefore, ammonia is injected or is only injected at the downstream endwalls 38, only one sidewall—the first side wall 32 or the second sidewall 34—and the upstream endwall 36 of the first flue 26 and the second flue 26.

Example 21

In this example, the plant is configured similar to the Example 1, except that the $NO_x$ abatement device nozzles are only positioned in the downstream endwalls 38, only one sidewall—the first side wall 32 or the second sidewall 34—and the upstream endwall 36 of only one flue 26—the first flue 26. To the extent that $NO_x$ abatement device nozzles 30 are present at any other location, those nozzles have been turned-off so no ammonia can be pumped in the flue at the other locations. Therefore, ammonia is injected or is only injected at the downstream endwalls 38, only one sidewall—the first side wall 32 or the second sidewall 34—and the upstream endwall 36 of only the first flue 26.

Example 22

Using any of the examples 1-21, aqueous ammonia was pumped into the exhaust gas and flue at specified flow rates. The flow rates are provided in FIG. 5. When ammonia is injected into the exhaust gas from an oxy-combustion furnace, surprisingly, there is noticeably $NO_x$ reduction. Noticeable and surprising $NO_x$ reduction was observed with as little as 0.19 GPM flow rate of 19 volume percent of aqueous ammonia into the exhaust gas (i.e. an ammonia flow rate of 0.036 GPM). More significant reductions were observed at higher flow rates, however, ammonia slip became a problem at 19 volume percent of aqueous ammonia flow rates above 1.0 GPM (i.e. an ammonia flow rate of 0.19 GPM).

The invention is further described in the following numbered clauses.

Clause 1: A plant for a combustion process, comprising: a furnace to heat a material, a burner configured to combust an oxidization gas and a carbon-based fuel in the furnace wherein the oxidization gas comprises at least 80 volume percent oxygen, specifically at least 85 volume percent, more specifically at least 90 volume percent, more specifically at least 92 volume percent, more specifically at least 94 volume percent or at least 95 volume percent oxygen; an exhaust outlet providing communication between the furnace and a flue and configured to remove an exhaust gas produced during the combustion process from the furnace to the flue; a nozzle positioned in the flue configured to inject an ammonia into the flue and/or into the exhaust gas, wherein the ammonia is selected from the group consisting of aqueous ammonia, anhydrous ammonia, urea or a combination thereof.

Clause 2: The plant according to clause 1, wherein the combustion process is used to make glass and the material heated in the furnace is a glass batch material.

Clause 3: The plant according to clause 1 or 2, wherein the flue comprises an upstream endwall, and the nozzle is positioned in the flue at the upstream endwall.

Clause 4: The plant according to clause 1 to 2, wherein the flue comprises a first sidewall, and the nozzle is positioned in the flue at the first sidewall.

Clause 5: The plant according to clause 4, wherein the flue comprises a second sidewall, and a second nozzle is positioned in the flue at the second sidewall approximately opposite or opposite the first nozzle.

Clause 6: The plant according to clause 1 or 2, wherein the nozzle is positioned in a downstream endwall of the flue.

Clause 7: The plant according to any of the clauses 1 to 6 further comprising a downcomer connecting the flue to the exhaust outlet.

Clause 8: The plant according to clause 7 wherein the nozzle is positioned in the flue at the endwall or sidewall where the downcomer connects to the flue.

Clause 9: The plant according to any of the clauses 1 to 6 wherein the exhaust outlet is an upstream exhaust outlet, and the plant further comprises a downstream exhaust outlet wherein the upstream exhaust outlet and the downstream exhaust outlet are in communication with the flue.

Clause 10: The plant according to clause 9 further comprising a downstream most downcomer connecting the downstream exhaust outlet to the flue, and an upstream most downcomer connecting the upstream exhaust outlet to the flue.

Clause 11: The plant according to clause 9 or 10 wherein the nozzle is positioned in the sidewall at a position downstream of the downstream most downcomer or the downstream exhaust outlet; between a downstream endwall of the flue and the downstream most downcomer or the downstream exhaust outlet; and/or between the downstream most downcomer or downstream exhaust outlet and the upstream most downcomer or the upstream exhaust outlet.

Clause 12: The plant according to any of the clauses 1 to 11 wherein the nozzle is configured to open or close.

Clause 13: The plant according to any of the clauses 1 to 12 wherein the nozzle is configured to increase or decrease a flow rate of the ammonia.

Clause 14: The plant according to any of the clauses 1 to 13 wherein the ammonia is injected into the exhaust gas at a total ammonia flow rate of at least 0.01 gallons per minute (GPM), at least 0.03 GPM, at least 0.05 GPM, at least 0.07 GPM, at least 0.09 GPM, at least 0.11 GPM, at least 0.13 GPM or at least 0.15 GPM; and/or the rate can be at most 0.4 GPM, at most 0.35 GPM, at most 0.32 GPM, at most 0.3 GPM, at most 0.28 GPM, at most 0.25 GPM or at most 0.22 GPM Clause 15: The plant according to any of the clauses 1 to 14 wherein the nozzle is positioned in the flue where the exhaust gas is at a reaction temperature between 850° C. and 1200° C.; or between 875° C. and 1150° C.; between 900° C. and 1100° C.; or between 950° C. and 1050° C.

Clause 16: The plant according to any of the clauses 1, 2, 4, 5, 7-15, wherein the plant is configured to only inject ammonia into a sidewall of the flue.

Clause 17: The plant according to clause 16 wherein the nozzle is positioned in the sidewall of the flue at approximately or at the junction between the downstream most downcomer or downstream exhaust outlet and the flue.

Clause 18: The plant according to clause 16 wherein the nozzle is positioned in the sidewall of the flue between the downstream most downcomer or downstream endwall of the flue.

Clause 19: The plant according to any of the clauses 1-3 or 7-15, wherein the plant is configured to only inject ammonia into an upstream endwall of the flue.

Clause 20: The plant according to clauses 1, 2, or 6-15, wherein the plant is configured to only inject ammonia into a downstream endwall of the flue.

Clause 21: The plant according to any of the clauses 1 to 20, wherein the plant does not include a catalyst to react the ammonia with the exhaust gas.

Clause 22: The plant according to any of the clauses 1 to 21, wherein the furnace is an oxy-combustion furnace.

Clause 23: The plant according to any of the clauses 1 to 22, wherein the exhaust gas is removed by an induced stack effect or an induced draft fan located in the flue.

Clause 24: The plant according to any of the clauses 1 to 22, wherein the exhaust gas is removed by an induced stack effect.

Clause 25: A plant for a combustion process, comprising: a furnace to heat a material, a burner configured to combust an oxidization gas and a carbon-based fuel in the furnace wherein the oxidization gas comprises at least 80 volume percent oxygen, specifically at least 85 volume percent, more specifically at least 90 volume percent, more specifically at least 92 volume percent, more specifically at least 94 volume percent or at least 95 volume percent oxygen; an exhaust outlet providing communication between the furnace and a flue and configured to remove an exhaust gas produced during the combustion process from the furnace to the flue; a plurality of nozzles positioned in the flue configured to inject an ammonia into the flue and/or into the exhaust gas, wherein the ammonia is selected from the group consisting of aqueous ammonia, anhydrous ammonia, urea or a combination thereof.

Clause 26: The plant according to clause 25, wherein the combustion process is used to make glass and the material heated in the furnace is a glass batch material.

Clause 27: The plant according to clause 25 or 26, wherein the flue comprises an upstream endwall, a first sidewall, a second sidewall, and a downstream endwall, wherein the plurality of nozzles are positioned in the upstream endwall, the first sidewall, the second sidewall, the downstream endwall, or any combination thereof.

Clause 28: The plant according to any of the clauses 25 to 27 further comprising a downcomer connecting the flue to the exhaust outlet, wherein at least a portion of the plurality of nozzles is positioned in the sidewall and/or upstream endwall of the flue at a position where the downcomer connects into the flue.

Clause 29: The plant according to any of the clauses 25 to 27 wherein the exhaust outlet is an upstream exhaust outlet, and the plant further comprises a downstream exhaust outlet wherein the upstream exhaust outlet and the downstream exhaust outlet are in communication with the flue.

Clause 30: The plant according to clause 29 further comprising a downstream most downcomer connecting the downstream exhaust outlet to the flue, and an upstream most downcomer connecting the upstream exhaust outlet to the flue.

Clause 31: The plant according to clause 29 or 20 wherein the plurality of nozzles is positioned in the sidewall at a position downstream of the downstream most downcomer or the downstream exhaust outlet; between a downstream endwall of the flue and the downstream most downcomer or the downstream exhaust outlet; and/or between the downstream most downcomer or downstream exhaust outlet and the upstream most downcomer or the upstream exhaust outlet.

Clause 32: The plant according to any of the clauses 25 to 31 wherein the nozzle is configured to open or close.

Clause 33: The plant according to any of the clauses 25 to 32 wherein the nozzle is configured to increase or decrease a flow rate of the ammonia.

Clause 34: The plant according to any of the clauses 25 to 33 wherein the ammonia is injected into the exhaust gas at a total ammonia flow rate of at least 0.01 gallons per minute (GPM), at least 0.03 GPM, at least 0.05 GPM, at least 0.07 GPM, at least 0.09 GPM, at least 0.11 GPM, at least 0.13 GPM or at least 0.15 GPM; and/or the rate can be at most 0.4 GPM, at most 0.35 GPM, at most 0.32 GPM, at most 0.3 GPM, at most 0.28 GPM, at most 0.25 GPM or at most 0.22 GPM.

Clause 35: The plant according to any of the clauses 25 to 34 wherein the nozzle is positioned in the flue where the exhaust gas is at a reaction temperature between 850° C. and 1200° C.; or between 875° C. and 1150° C.; between 900° C. and 1100° C.; or between 950° C. and 1050° C.

Clause 36: The plant according to clauses 25 to 34, wherein the plant is configured to only inject ammonia into a sidewall of the flue.

Clause 37: The plant according to clause 36 wherein the nozzle is positioned in the sidewall of the flue at approximately or at the junction between the downstream most downcomer or downstream exhaust outlet and the flue.

Clause 38: The plant according to clause 36 wherein the nozzle is positioned in the sidewall of the flue between the downstream most downcomer or downstream endwall of the flue.

Clause 39: The plant according to clauses 25 to 34, wherein the plant is configured to only inject ammonia into a sidewall of an upstream endwall of the flue.

Clause 40: The plant according to clauses 25 to 34, wherein the plant is configured to only inject ammonia into a sidewall of a downstream endwall of the flue.

Clause 41: The plant according to any of the clauses 25 to 40, wherein the plant does not include a catalyst to react the ammonia with the exhaust gas.

Clause 42: The plant according to any of the clauses 25 to 41, wherein the furnace is an oxy-combustion furnace.

Clause 43: The plant according to any of the clauses 25 to 42, wherein the exhaust gas is removed by an induced stack effect or an induced draft fan located in the flue.

Clause 44: The plant according to any of the clauses 25 to 42, wherein the exhaust gas is removed by an induced stack effect.

Clause 45: A plant for a combustion process, comprising: a furnace to heat a material, a burner configured to combust an oxidization gas and a carbon-based fuel in the furnace wherein the oxidization gas comprises at least 80 volume percent oxygen, specifically at least 85 volume percent, more specifically at least 90 volume percent, more specifically at least 92 volume percent, more specifically at least 94 volume percent or at least 95 volume percent oxygen; a first exhaust outlet providing communication between the furnace and a first flue and configured to remove an exhaust gas produced during the combustion process from the furnace to the first flue; one or a plurality of first flue nozzles positioned in the first flue configured to inject an ammonia into the first flue and/or into the exhaust gas, wherein the ammonia is selected from the group consisting of aqueous ammonia, anhydrous ammonia, urea or a combination thereof; and a second exhaust outlet providing communication between the furnace and a second flue and configured to remove the exhaust gas produced during the combustion process from the furnace to the second flue.

Clause 46: The plant according to clause 45 wherein the second flue does not include any nozzles configured to inject the ammonia into the second flue.

Clause 47: The plant according to clause 45 wherein the second flue comprises one or a plurality of second flue nozzles wherein the second flue nozzle(s) are configured to an off position so that ammonia cannot be injected into the second flue.

Clause 48: The plant according to clause 45 wherein the second flue comprises one or a plurality of second flue nozzles configured to inject the ammonia into the second flue.

Clause 49: The plant according to any of the clauses 45 to 48, wherein the combustion process is used to make glass and the material heated in the furnace is a glass batch material.

Clause 50: The plant according to any of the clauses 45 to 49, wherein the first flue comprises an upstream endwall, a first sidewall, a second sidewall, and a downstream endwall, wherein the one nozzle or the plurality of nozzles are positioned in the upstream endwall, the first sidewall, the second sidewall, the downstream endwall, or any combination thereof.

Clause 51: The plant according to any of the clauses 45 to 50 further comprising a downcomer connecting the first flue to the first exhaust outlet, wherein the one nozzle or the plurality of nozzles is positioned in the sidewall of the first flue and/or the upstream endwall of the first flue.

Clause 52: The plant according to any of the clauses 45 to 51 wherein the first exhaust outlet is a first upstream exhaust outlet, and the plant further comprises a first downstream exhaust outlet wherein the first upstream exhaust outlet and the first downstream exhaust outlet are in communication with the first flue.

Clause 53: The plant according to clause 52 further comprising a first downstream most downcomer connecting the first downstream exhaust outlet to the first flue, and a first upstream most downcomer connecting the first upstream exhaust outlet to the flue.

Clause 54: The plant according to any of the clauses 45 to 53 wherein the one nozzle or the plurality of nozzles is positioned in the sidewall at a position downstream of the downstream most downcomer or the downstream exhaust outlet; between a downstream endwall of the flue and the downstream most downcomer or the downstream exhaust outlet; between the downstream most downcomer or downstream exhaust outlet and the upstream most downcomer or the upstream exhaust outlet; or any combination hereof.

Clause 55: The plant according to any of the clauses 45 to 54 wherein the one nozzle or the plurality of nozzles is configured to open or close.

Clause 56: The plant according to any of the clauses 45 to 55 wherein the one nozzle or the plurality of nozzles is configured to increase or decrease a flow rate of the ammonia.

Clause 57: The plant according to any of the clauses 45 to 56 wherein the ammonia is injected into the exhaust gas at a total ammonia flow rate of at least 0.01 gallons per minute (GPM), at least 0.03 GPM, at least 0.05 GPM, at least 0.07 GPM, at least 0.09 GPM, at least 0.11 GPM, at least 0.13 GPM or at least 0.15 GPM; and/or the rate can be at most 0.4 GPM, at most 0.35 GPM, at most 0.32 GPM, at most 0.3 GPM, at most 0.28 GPM, at most 0.25 GPM or at most 0.22 GPM.

Clause 58: The plant according to any of the clauses 45 to 57 wherein the one nozzle or the plurality of nozzles is positioned in the first flue where the exhaust gas is at a reaction temperature between 850° C. and 1200° C.; or between 875° C. and 1150° C.; between 900° C. and 1100° C.; or between 950° C. and 1050° C.

Clause 59: The plant according to clauses 45 to 58, wherein the plant is configured to only inject ammonia into a sidewall of the first flue.

Clause 60: The plant according to clause 59 wherein the one nozzle or the plurality of nozzles is positioned in the sidewall of the flue at approximately or at the junction between the first downstream most downcomer or first downstream exhaust outlet and the first flue.

Clause 61: The plant according to clause 59 wherein the one nozzle or the plurality of nozzles is positioned in the sidewall of the first flue between the first downstream most downcomer or first downstream endwall of the first flue.

Clause 62: The plant according to clauses 45 to 61, wherein the plant is configured to only inject ammonia into a sidewall of a first upstream endwall of the first flue.

Clause 63: The plant according to clauses 45 to 62, wherein the plant is configured to only inject ammonia into a sidewall of a first downstream endwall of the first flue.

Clause 64: The plant according to any of the clauses 45 to 63, wherein the plant does not include a catalyst to react the ammonia with the exhaust gas.

Clause 65: The plant according to any of the clauses 45 to 64, wherein the furnace is an oxy-combustion furnace.

Clause 66: The plant according to any of the clauses 45 to 65, wherein the exhaust gas is removed by an induced stack effect or an induced draft fan located in the flue.

Clause 67: The plant according to any of the clauses 45 to 66, wherein the exhaust gas is removed by an induced stack effect.

Clause 68: The plant according to any of the clauses 45 to 67 wherein the furnace comprises a second upstream exhaust outlet and a second downstream exhaust outlet providing communication between the second flue and the furnace, and optionally a second upstream downcomer connecting the second upstream exhaust outlet to the second flue, and optionally a second downstream downcomer connecting the second downstream exhaust outlet to the second flue.

Clause 69: The plant according to clause 68 the second flue comprises an upstream endwall, a first sidewall, a second sidewall, and a downstream endwall, wherein the one nozzle or the plurality of nozzles are positioned in the upstream endwall, the first sidewall, the second sidewall, the downstream endwall, or any combination thereof.

Clause 70: The plant according to any of the clauses 68 to 69 wherein the one nozzle or the plurality of nozzles in the second flue is positioned where the exhaust gas is at a reaction temperature between 850° C. and 1200° C.; or between 875° C. and 1150° C.; between 900° C. and 1100° C.; or between 950° C. and 1050° C. in the second flue.

Clause 71: A method for reducing $NO_x$ emissions in an oxy-combustion furnace comprising burning a carbon-based fuel in an oxidization gas comprising at least 80 volume percent oxygen, specifically at least 85 volume percent, more specifically at least 90 volume percent, more specifically at least 92 volume percent, more specifically at least 94 volume percent or at least 95 volume percent oxygen; exhausting the exhaust gas through an exhaust outlet into a flue; reacting the exhaust gas with an ammonia in the flue; and exhausting the exhaust gas out of the flue.

Clause 72: The method according to clause 71, wherein the oxy-combustion furnace is an oxy-combustion glass melting furnace.

Clause 73: The method according to clause 71 or 72 further comprising melting a raw material in the oxy-combustion furnace.

Clause 74: The method according to clause 73 wherein the raw material is a glass batch.

Clause 75: The method according to any of the clauses 71 to 74, wherein the ammonia is injected into the flue at an upstream endwall, a first sidewall, a second sidewall, a downstream endwall or combination thereof.

Clause 76: The method according to any of the clauses 71 to 75, wherein the ammonia is injected into the flue at the first sidewall.

Clause 77: The method according to any of the clauses 71 to 76, wherein the ammonia is injected in the flue at the first sidewall and the second sidewall at a point approximately opposite or opposite the first sidewall injection location.

Clause 78: The method according to any of the clauses 71 to 74, wherein the ammonia is injected into the flue at the downstream endwall of the flue.

Clause 79: The method according to any of the clauses 71 to 78, wherein the exhaust gas is exhausted out of the furnace through the exhaust outlet through a downcomer into the flue.

Clause 80: The method according to clause 79 wherein the ammonia is injected into the flue at the endwall or sidewall where the downcomer connects to the flue.

Clause 81: The method according to any of the clauses 71 to 78 wherein the exhaust outlet is an upstream exhaust outlet, and the exhaust gas further exhausts out of a downstream exhaust outlet and a downstream most downcomer and the upstream exhaust outlet through a upstream downcomer into the flue, wherein ammonia is injected into the flue at a position downstream of the downstream most downcomer or the downstream exhaust outlet; between a downstream endwall of the flue and the downstream most downcomer or the downstream exhaust outlet; between the downstream most downcomer or downstream exhaust outlet and the upstream most downcomer or the upstream exhaust outlet, or a combination thereof.

Clause 82: The method according to any of the clauses 71 to 81 wherein the injection of ammonia is injected at a flow rate that can be increased or decreased.

Clause 83: The method according to any of the clauses 71 to 82 wherein the ammonia is injected into the exhaust gas at a total ammonia flow rate of at least 0.01 gallons per minute (GPM), at least 0.03 GPM, at least 0.05 GPM, at least 0.07 GPM, at least 0.09 GPM, at least 0.11 GPM, at least 0.13 GPM or at least 0.15 GPM; and/or the rate can be at most 0.4 GPM, at most 0.35 GPM, at most 0.32 GPM, at most 0.3 GPM, at most 0.28 GPM, at most 0.25 GPM or at most 0.22 GPM.

Clause 84: The method according to any of the clauses 71 to 83 wherein the ammonia is injected in the flue where the exhaust gas is at a reaction temperature between 850° C. and 1200° C.; or between 875° C. and 1150° C.; between 900° C. and 1100° C.; or between 950° C. and 1050° C.

Clause 85: The plant according to clauses 71 to 84, wherein the ammonia is injected into a sidewall of the flue.

Clause 86: The method according to any of the clauses 71 to 85, wherein ammonia is only injected at approximately or at the junction between the downstream most downcomer or downstream exhaust outlet and the flue.

Clause 87: The method according to any of the clauses 71 to 86, wherein the ammonia is injected into the sidewall of the flue between the downstream most downcomer or downstream endwall of the flue.

Clause 88: The method according to any of the clauses 71-87, wherein the ammonia is only injected into a first sidewall of the flue, a second sidewall of the flue, a downstream endwall of the flue, an upstream endwall of the flue, or the first sidewall and the second sidewall of the flue.

Clause 89: The method according to any of the clauses 71-88, wherein the exhaust gas is exhausted into a second flue, wherein the first flue and the second flue are in communication with a smokestack.

Clause 90: The method according to clause 89, wherein ammonia is not injected into the second flue.

Clause 91: The method according to clause 89 or 90 wherein ammonia is injected into the second flue at an upstream endwall, a first sidewall, a second sidewall, a downstream endwall or combination thereof in the second flue.

Clause 92: The method according to clause 91 wherein the ammonia is injected into the exhaust gas at a total ammonia flow rate of at least 0.01 gallons per minute (GPM), at least 0.03 GPM, at least 0.05 GPM, at least 0.07 GPM, at least 0.09 GPM, at least 0.11 GPM, at least 0.13 GPM or at least 0.15 GPM; and/or the rate can be at most 0.4 GPM, at most 0.35 GPM, at most 0.32 GPM, at most 0.3 GPM, at most 0.28 GPM, at most 0.25 GPM or at most 0.22 GPM.

Clause 93: The method according to any of the clauses 71 to 92, wherein a catalyst is not used to react the ammonia with the exhaust gas.

Clause 94: The method according to any of the clauses 71 to 93, wherein the furnace is an oxy-combustion furnace.

Clause 95: The method according to any of the clauses 71 to 94, wherein the exhaust gas is removed by an induced stack effect or an induced draft fan located in the flue.

Clause 96: The method according to any of the clauses 71 to 94, wherein the exhaust gas is removed by an induced stack effect.

The invention claimed is:

1. A plant for a combustion process, comprising:
   a furnace to heat a material;
   a plurality of burners configured to combust a carbon-based fuel with an oxidization gas to provide a flame into the furnace, wherein the oxidization gas comprises at least 80 volume percent oxygen;
   a first upstream exhaust outlet providing communication between the furnace and a first flue and configured to remove an exhaust gas produced during the combustion of the carbon-based fuel from the furnace to the first flue;
   a second upstream exhaust outlet providing communication between the furnace and a second flue and configured to remove the exhaust gas from the furnace to the flue;
   a first downstream exhaust outlet providing communication between the furnace and the first flue and configured to remove the exhaust gas from the furnace to the flue;
   a second downstream exhaust outlet providing communication between the furnace and the second flue and configured to remove the exhaust gas from the furnace to the flue;
   a nozzle located in the first flue and configured to inject an ammonia in the flue.

2. The plant according to claim 1, wherein the second flue does not comprise any open nozzles.

3. The plant according to claim 2, further comprising:
   a first upstream most downcomer connecting the first flue to the first upstream exhaust outlet;
   a first downstream most downcomer connecting the first flue to the first downstream exhaust outlet;
   a second upstream most downcomer connecting the second flue to the second upstream exhaust outlet; and
   a second downstream most downcomer connecting the second flue to the second downstream exhaust outlet;
   wherein the nozzle is positioned in a first sidewall, or a floor of the first flue at a junction between the first downstream most downcomer and the first flue, or downstream, of the junction between the first downstream most downcomer and the first flue.

4. The plant according to claim 3 further comprising a second nozzle positioned in a second sidewall of the first flue opposite of the nozzle positioned in the first sidewall.

5. The plant according to claim 1 further comprising a second nozzle positioned in the second flue configured to inject an ammonia in the flue.

6. The plant according to claim 1 wherein the plant does not comprise a catalyst used to react the exhaust gas with the ammonia.

* * * * *